US011942022B2

(12) United States Patent
Yoon et al.

(10) Patent No.: US 11,942,022 B2
(45) Date of Patent: Mar. 26, 2024

(54) METHOD OF CORRECTING INPUT IMAGE DATA AND LIGHT-EMITTING DISPLAY APPARATUS PERFORMING THE METHOD

(71) Applicant: LG Display Co., Ltd., Seoul (KR)

(72) Inventors: YeoMyeong Yoon, Paju-si (KR); Li-Jin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/072,111

(22) Filed: Nov. 30, 2022

(65) Prior Publication Data

US 2023/0215339 A1 Jul. 6, 2023

(30) Foreign Application Priority Data

Dec. 30, 2021 (KR) ........................ 10-2021-0192165

(51) Int. Cl.
*G09G 3/20* (2006.01)

(52) U.S. Cl.
CPC ....... *G09G 3/2096* (2013.01); *G09G 2310/08* (2013.01); *G09G 2320/0233* (2013.01); *G09G 2320/0242* (2013.01); *G09G 2320/0666* (2013.01); *G09G 2320/0686* (2013.01); *G09G 2360/16* (2013.01)

(58) Field of Classification Search
CPC ............. G09G 3/2096; G09G 2310/08; G09G 2320/0233; G09G 2320/0666; G09G 2320/0686; G09G 2360/16
See application file for complete search history.

(56) References Cited

U.S. PATENT DOCUMENTS

| | | | | |
|---|---|---|---|---|
| 11,037,523 B2 * | 6/2021 | Hei | G09G 5/02 | |
| 11,462,156 B2 * | 10/2022 | Yang | G09G 5/10 | |
| 11,568,782 B2 * | 1/2023 | Park | G09G 3/2003 | |
| 2020/0212332 A1 * | 7/2020 | Shim | G09G 3/3233 | |
| 2021/0241680 A1 * | 8/2021 | Ock | G09G 3/32 | |
| 2022/0028311 A1 * | 1/2022 | Matsueda | G09G 3/006 | |
| 2022/0139336 A1 * | 5/2022 | Jeon | H10K 59/65 | 345/694 |
| 2022/0366832 A1 * | 11/2022 | Bae | G09G 3/2007 | |
| 2023/0102440 A1 * | 3/2023 | Aogaki | G09G 5/10 | 345/690 |
| 2023/0120671 A1 * | 4/2023 | Aogaki | G09G 3/006 | 345/204 |

FOREIGN PATENT DOCUMENTS

| | | |
|---|---|---|
| KR | 10-1015753 B1 | 2/2011 |
| KR | 10-2017-0042846 A | 4/2017 |
| KR | 10-2017-0050748 A | 5/2017 |

* cited by examiner

*Primary Examiner* — Gene W Lee
(74) *Attorney, Agent, or Firm* — Birch, Stewart, Kolasch & Birch, LLP

(57) ABSTRACT

A method of correcting input image data for a display device can include receiving input image data by a controller in the display device, a first portion of the input image data corresponding to a first region of a display panel in the display device and a second portion of the input image data corresponding to a second region of the display panel having a pixel density different than a pixel density of the first region; and correcting, by the controller, at least some of the input image data to generate corrected image data based on at least one white correction value or at least one monochromatic correction value.

18 Claims, 4 Drawing Sheets

METHOD OF CORRECTING INPUT IMAGE DATA AND LIGHT-EMITTING DISPLAY APPARATUS PERFORMING THE METHOD

CROSS-REFERENCE TO RELATED APPLICATIONS

This application claims priority to Korean Patent Application No. 10-2021-0192165 filed in the Republic of Korea, on Dec. 30, 2021, the entire contents of which are hereby expressly incorporated by reference into the present application.

BACKGROUND

Technical Field

The present disclosure relates to a method and apparatus, particularly to, for example, without limitation, a method of correcting input image data and a light-emitting display apparatus performing the method.

Discussion of the Related Art

Light-emitting display apparatuses can include a camera, and particularly, the camera can be provided under a display area.

In this situation, the image quality of the camera can be degraded by interference between various lines and wiring included in a light-emitting display panel. In order to solve such a limitation, in a light-emitting display panel, a density of pixels in a camera region corresponding to a region of the display that overlaps with the camera can be lower than a density of pixels of a normal region that does not overlap with the camera.

In this situation, even when data voltages corresponding to the same luminance are supplied to pixels included in the camera region and pixels included in the normal region, the luminance of the camera region can differ from that of the normal region. For example, the pixel region over the camera may appear dimmer or less bright than other areas of the display.

Due to this, a defect can occur where the camera region may be noticeable to a viewer.

SUMMARY OF THE DISCLOSURE

Therefore, the inventors have recognized limitations described above. Accordingly, embodiments of the present disclosure are directed to providing a method of correcting input image data and a light-emitting display apparatus performing the method that substantially obviate one or more issues due to limitations and disadvantages of the related art.

An aspect of the present disclosure is to provide a method of correcting input image data and a light-emitting display apparatus performing the method, which can correct input image data by using a white correction value based on a luminance difference between a camera region and a normal region a when white image is applied and a monochromatic correction value based on a luminance difference between the camera region and the normal region when a monochromatic image is applied.

Additional aspects and features of the disclosure will be set forth in part in the description which follows and in part will become apparent to those having ordinary skill in the art upon examination of the following or can be learned by practice of the inventive concepts provided herein. Other features and aspects of the inventive concepts can be realized and attained by the structure particularly pointed out in the present disclosure and claims hereof as well as the appended drawings.

To achieve these and other aspects of the inventive concepts, as embodied and broadly described herein, there is provided a method of correcting input image data, the method including a step of correcting input image data to generate image data, based on at least one of a white correction value and a monochromatic correction value.

The white correction value can be generated by analyzing a luminance difference between white images displayed on a normal region and a camera region of a light-emitting display panel, and generating the white correction value, based on a luminance difference analysis result of the white images.

The step of generating the monochromatic correction value can include analyzing a luminance difference between monochromatic images displayed on the normal region and the camera region, generating the monochromatic correction value based on a luminance difference analysis result of the monochromatic images, and storing the monochromatic correction value in the controller.

The step of analyzing the luminance difference between the monochromatic images and the step of generating the monochromatic correction value can be performed on each of a red image, a green image, and a blue image.

The step of analyzing the luminance difference between the monochromatic images on each of the red image, the green image, and the blue image can include analyzing a luminance difference between the camera region and the normal region when the red image is displayed, analyzing a luminance difference between the camera region and the normal region when the green image is displayed, and analyzing a luminance difference between the camera region and the normal region when the blue image is displayed.

The step of generating the monochromatic correction value for each of the red image, the green image, and the blue image can include correcting a red input image data by using a monochromatic correction value associated with the red image, correcting a green input image data by using a monochromatic correction value associated with the green image, and correcting a blue input image data by using a monochromatic correction value associated with the blue image.

The step of analyzing the luminance difference between the white images can include a step of analyzing luminance differences in the camera region and the normal region when white images corresponding to at least three different luminance levels are displayed on the camera region and the normal region.

The white correction value can be generated by using at least three luminance difference values generated based on the luminance differences and at least one interpolation difference value generated based on the at least three luminance difference values.

The step of analyzing the luminance difference between the monochromatic images can include analyzing luminance differences in the camera region and the normal region when monochromatic images corresponding to the at least three different luminance levels can be displayed on the camera region and the normal region.

The monochromatic correction value can be generated by using the at least three luminance difference values generated based on the luminance differences and the at least one interpolation difference value generated based on the at least three luminance difference values.

The step of correcting the input image data can include calculating a maximum value and a minimum value of input image data respectively corresponding to a red pixel, a green pixel, and a blue pixel included in a unit pixel; determining whether a difference between the maximum value and the minimum value is greater than a reference value; correcting the input image data by using the white correction value when the difference is less than or equal to the reference value; and correcting the input image data by using the white correction value and the monochromatic correction value when the difference is greater than the reference value.

According to another aspect of the present disclosure, there is provided a light-emitting display apparatus including a light-emitting display panel, a camera provided under the light-emitting display panel, a controller configured to correct input image data to generate image data, based on at least one of a white correction value and a monochromatic correction value, in which the light-emitting display panel includes a camera region corresponding to the camera and a normal region where the camera is not provided, the white correction value includes information associated with a luminance difference when a white image is displayed on the camera region and the normal region, and the monochromatic correction value includes information associated with a luminance difference when a monochromatic image is displayed on the camera region and the normal region.

A monochromatic correction value can be generated for each of a red image, a green image, and a blue image.

The controller can include a data aligner configured to realign the input image data to generate the image data; a control signal generator configured to generate control signals by using a timing synchronization signal; an input unit configured to receive the timing synchronization signal and the input image data and transferring the timing synchronization signal and the input image data to the data aligner and the control signal generator.

The controller can be configured to compare a reference value with a difference between a maximum value and a minimum value of the input image data, to correct the input image data by using at least one of the white correction value and the monochromatic correction value.

A density of pixels of the camera region can be less than a density of pixels of the normal region.

The controller can be configured to calculate a maximum value and a minimum value of input image data respectively corresponding to a red pixel, a green pixel, and a blue pixel included in a unit pixel; determine whether a difference between the maximum value and the minimum value is greater than a reference value; correct the input image data by using the white correction value when the difference is less than or equal to the reference value; and correct the input image data by using the white correction value and the monochromatic correction value when the difference is greater than the reference value.

It is to be understood that both the foregoing general description and the following detailed description of the present disclosure are examples and explanatory and are intended to provide further explanation of inventive concepts as claimed.

BRIEF DESCRIPTION OF THE DRAWINGS

The accompanying drawings, which can be included to provide a further understanding of the disclosure and can be incorporated in and constitute a part of the disclosure, illustrate embodiments of the disclosure and together with the description serve to explain various principles of the disclosure. In the drawings.

Throughout the drawings and the detailed description, unless otherwise described, the same drawing reference numerals should be understood to refer to the same elements, features, and structures.

DETAILED DESCRIPTION OF THE EMBODIMENTS

Figure 1:
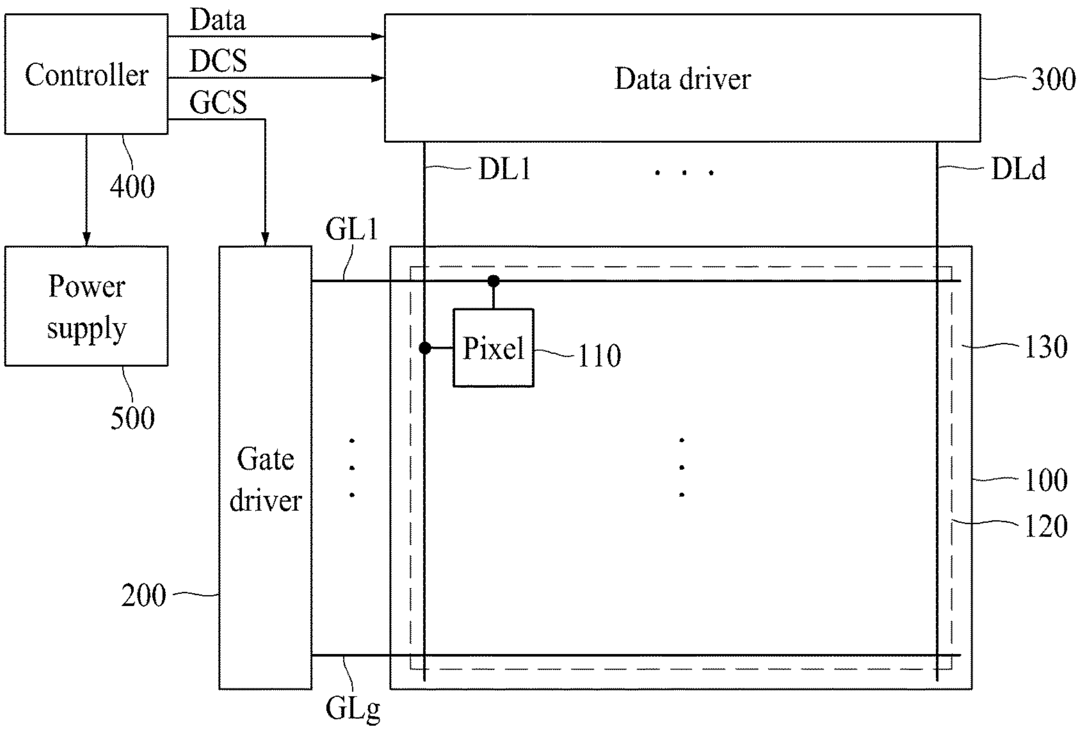
FIG. 1 is an example diagram illustrating a configuration of a light-emitting display apparatus according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments can be provided so that this disclosure can be sufficiently thorough and complete to assist those skilled in the art to will fully understand the scope of the present disclosure. Further, the present disclosure is only defined by scopes of claims.

Shapes, sizes, ratios, angles, and numbers disclosed in the drawings for describing embodiments of the present disclosure can be merely example, and thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration will be omitted or can be briefly provided. When "comprise," "have," and "include" described in the present disclosure can be used, another part can be added unless a more limiting term, such as "only" is used. The terms of a singular form can include plural forms unless referred to the contrary.

In construing an element, the element is construed as including an error or tolerance range although there is no explicit description of such an error or tolerance range.

In the description of the various embodiments of the present disclosure, where position relationships, for example, where a positional relation between two parts is described using "on," "over," "under," "above," "below," "beside" and "next" or the like, one or more other parts can be located between the two parts unless a more limiting term, such as "immediate(ly)" or "direct(ly)" is used.

In describing a temporal relationship, for example, when the temporal order is described as, for example, "after," "subsequent," "next," and "before," a situation that is not continuous can be included unless a more limiting term, such as "just," "immediate(ly)," or "direct(ly)" is used.

Although the terms "first," "second," A, B, (a), (b), and the like can be used herein to describe various elements, these elements should not be interpreted to be limited by these terms as they are not used to define a particular order or precedence. These terms are used only to differentiate one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms can be merely for differentiating one element from another element, and the essence, sequence, basis, order, or number of the corresponding elements should not be limited by these terms. The expression that an element is "connected," "coupled," or "adhered" to another element or layer should be understood to mean that the element or layer can not only be directly connected or adhered to another element or layer, but also be indirectly connected or adhered to another element or layer with one or more intervening elements or layers being "disposed," or "interposed" between the elements or layers, unless otherwise specified.

The term "at least one" should be understood as including any and all combinations of one or more of the associated listed items. For example, the meaning of "at least one of a first item, a second item, and a third item" encompasses the combination of all three listed items, combinations of any two of the three items as well as each individual item, the first item, the second item, or the third item.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, embodiments of the present disclosure will be described in detail with reference to the accompanying drawings. Further, for convenience of description, a scale, size and thickness in which each of elements is illustrated in the accompanying drawings can differ from a real scale, size and thickness, and thus, the illustrated elements are not limited to the specific scale, size and thickness in which they are illustrated in the drawings.

Figure 2:
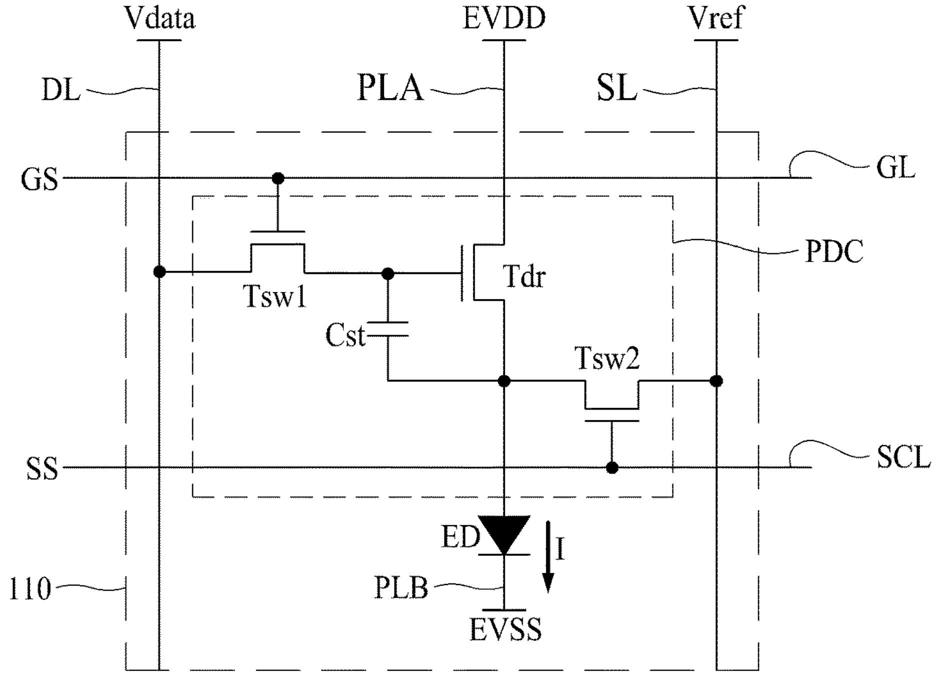
FIG. 2 is an example diagram illustrating a structure of a pixel applied to a light-emitting display apparatus according to an embodiment of the present disclosure.
Figure 3:
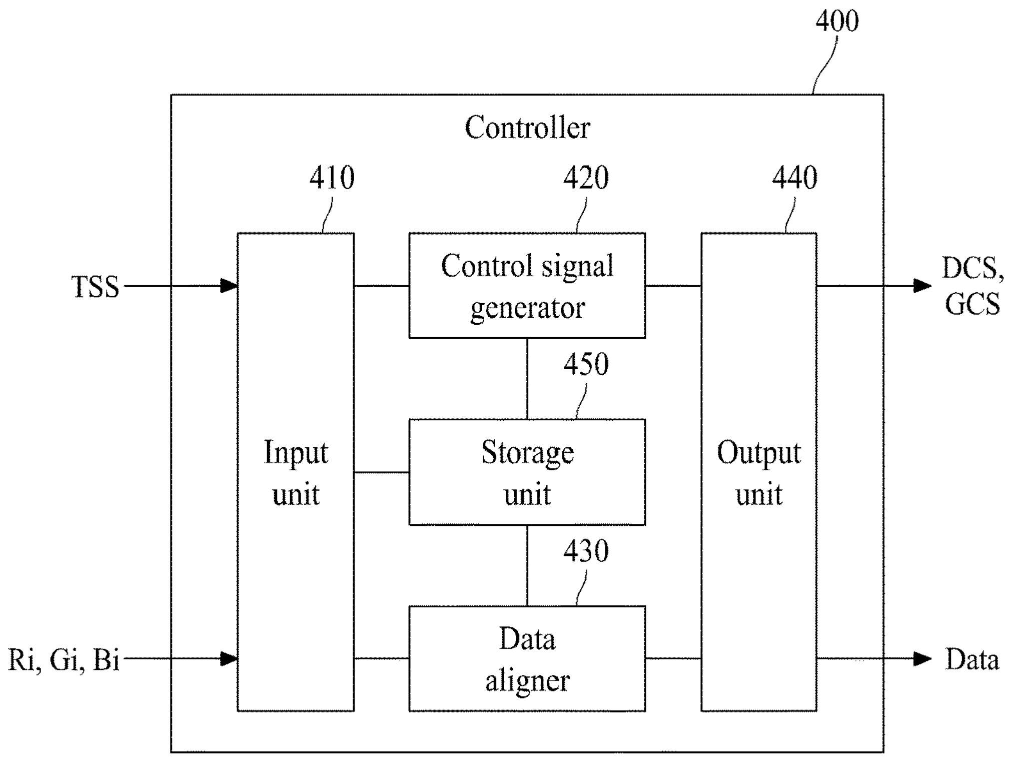
FIG. 3 is an example diagram illustrating a configuration of a controller applied to a light-emitting display apparatus according to an embodiment of the present disclosure.

FIG. 1 is an example diagram illustrating a configuration of a light-emitting display apparatus according to an embodiment of the present disclosure. FIG. 2 is an example diagram illustrating a structure of a pixel applied to a light-emitting display apparatus according to an embodiment of the present disclosure. FIG. 3 is an example diagram illustrating a configuration of a controller applied to a light-emitting display apparatus according to an embodiment of the present disclosure. All the components of light-emitting display apparatus according to all embodiments of the present disclosure are operatively coupled and configured.

The light-emitting display apparatus according to an embodiment of the present disclosure can configure various electronic devices. The electronic devices can include, for example, without limitation, smartphones, tablet personal computers (PCs), televisions (TVs), and monitors (e.g., in vehicles or other transportation means).

The light-emitting display apparatus according to an embodiment of the present disclosure, as illustrated in FIG. 1, can include a light-emitting display panel 100 which includes a display area 120 displaying an image and a non-display area 130 provided outside the display area 120, a gate driver 200 which supplies a gate signal to a plurality of gate lines GL1 to GLg provided in the display area 120 of the light-emitting display panel 100, a data driver 300 which supplies data voltages to a plurality of data lines DL1 to DLd provided in the light-emitting display panel 100, a controller 400 which controls driving of the gate driver 200 and the data driver 300, and a power supply 500 which supplies power to the controller 400, the gate driver 200, the data driver 300, and the light-emitting display panel 100.

First, the light-emitting display panel 100 can include the display area 120 and the non-display area 130. The gate lines GL1 to GLg, the data lines DL1 to DLd, and pixels 110 can be provided in the display area 120. Accordingly, the display area 120 can display an image. Here, g and d can each be a natural number. The non-display area 130 can surround the display area 120.

The pixel 110 included in the display panel 100, as illustrated in FIG. 2, can include a pixel driving circuit PDC, including a switching transistor Tsw1, a storage capacitor Cst, a driving transistor Tdr, and a sensing transistor Tsw2, and an emission area including a light-emitting device ED.

A first terminal of the driving transistor Tdr can be connected to a high voltage supply line PLA through which a high voltage EVDD is supplied, and a second terminal of the driving transistor Tdr can be connected to the light-emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied to the data line DL, and a gate signal GS can be supplied to the gate line GL.

The sensing transistor Tsw2 can be provided for measuring a threshold voltage or mobility of the driving transistor. A first terminal of the sensing transistor Tsw2 can be connected to a second terminal of the driving transistor Tdr and the light-emitting device ED, a second terminal of the sensing transistor Tsw2 can be connected to a sensing line SL through which a reference voltage Vref is supplied, and a gate of the sensing transistor Tsw2 can be connected to a sensing control line SCL through which a sensing control signal SS is supplied.

The sensing line SL can be connected to the data driver 300 and can also be connected to the power supply 500 through the data driver 300. For example, the reference voltage Vref supplied from the power supply 500 can be supplied to pixels through the sensing line SL, and sensing signals transferred from the pixels can be processed by the data driver 300.

A structure of the pixel 110 applied to the light-emitting display apparatus according to the present disclosure is not limited to a structure illustrated in FIG. 2. Accordingly, a structure of the pixel 110 can be changed to various types.

Hereinafter, however, for convenience of description, a light-emitting display apparatus including the pixels illustrate in FIG. 2 will be described as an example of the present disclosure.

The controller 400 can realign input video data transferred from an external system by using a timing synchronization signal transferred from the external system and can generate data control signals DCS which are to be supplied to the data driver 300 and gate control signals GCS which are to be supplied to the gate driver 200.

To this end, as illustrated in FIG. 3, the controller 400 can include a data aligner 430 which realigns the input video data Ri, Gi, and Bi to generate image data Data and supplies the image data Data to the data driver 300, a control signal generator 420 which generates the gate control signal GCS and the data control signal DCS by using the timing synchronization signal TSS, an input unit 410 which receives the timing synchronization signal TSS and the input video data Ri, Gi, and Bi transferred from the external system and respectively transfers the timing synchronization signal TSS and the input video data Ri, Gi, and Bi to the data aligner 430 and the control signal generator 420, and an output unit 440 which supplies the data driver 300 with the image data Data generated by the data aligner 430 and the data control signal DCS generated by the control signal generator 420 and supplies the gate driver 200 with the gate control signals GCS generated by the control signal generator 420.

Particularly, the controller 400 can include a storage unit 450 for storing various information.

The storage unit 450 can store a white correction value and a monochromatic correction value, which will be described below.

The white correction value and the monochromatic correction value can be generated in performing a process of manufacturing a light-emitting display apparatus and can be stored in the storage unit 450.

The external system can perform a function of driving the controller 400 and an electronic device. For example, when the electronic device is a TV, the external system can receive various sound information, video information, and letter information over a communication network and can transfer the received video information to the controller 400. In this situation, the image information can include input video data.

The power supply 500 can generate various power levels and can supply the generated power levels to the controller 400, the gate driver 200, the data driver 300, and the light-emitting display panel 100.

The gate driver 200 can be implemented as an IC and can be provided in the non-display area 130. Alternatively, the gate driver 200 can be directly embedded in the non-display area 130 by using a gate in panel (GIP) type. When the GIP type is used, transistors configuring the gate driver 200 can be provided in the non-display area 130 through the same or similar process as transistors included in each pixel 110.

The gate driver 200 can supply gate pulses to the gate lines GL1 to GLg.

When the gate pulse generated by the gate driver 200 is supplied to a gate of the switching transistor Tsw1 included in the pixel 110, the switching transistor Tsw1 can be turned on. When the switching transistor Tsw1 is turned on, a data voltage Vdata supplied through the data line DL can be supplied to the pixel 110.

When a gate off signal generated by the gate driver 200 is supplied to the switching transistor Tsw1, the switching transistor Tsw1 can be turned off. When the switching transistor Tsw1 is turned off, the data voltage Vdata may not be supplied to the pixel 110 any longer. But embodiments of the present disclosure are not limited thereto.

The gate signal GS supplied to the gate line GL can include a gate pulse and a gate off signal.

Finally, the data driver 300 can be mounted on a chip on film attached on the light-emitting display panel 100, or can be directly equipped in the light-emitting display panel 100.

The data driver 300 can supply data voltages Vdata to the data lines DL1 to DLd.

Figure 4:
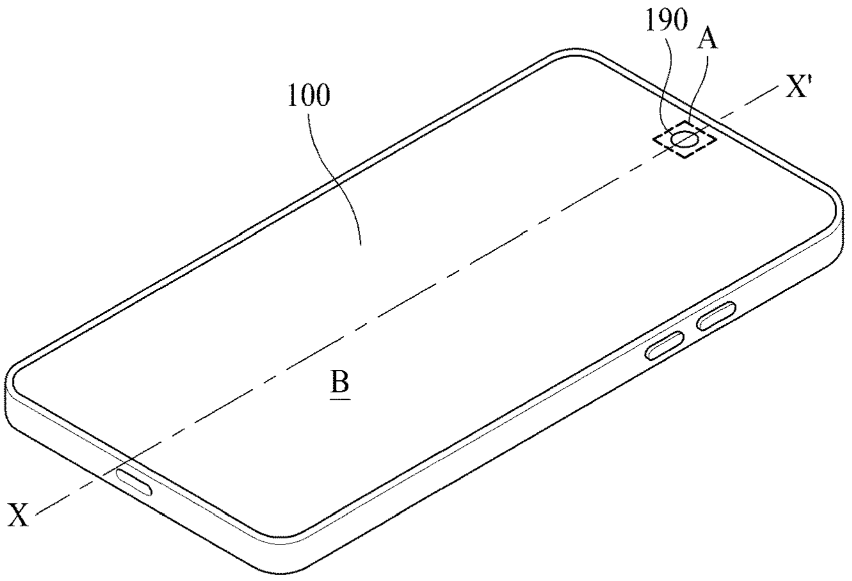
FIG. 4 is a perspective view illustrating an external appearance of a light-emitting display apparatus according to an embodiment of the present disclosure.
Figure 5:
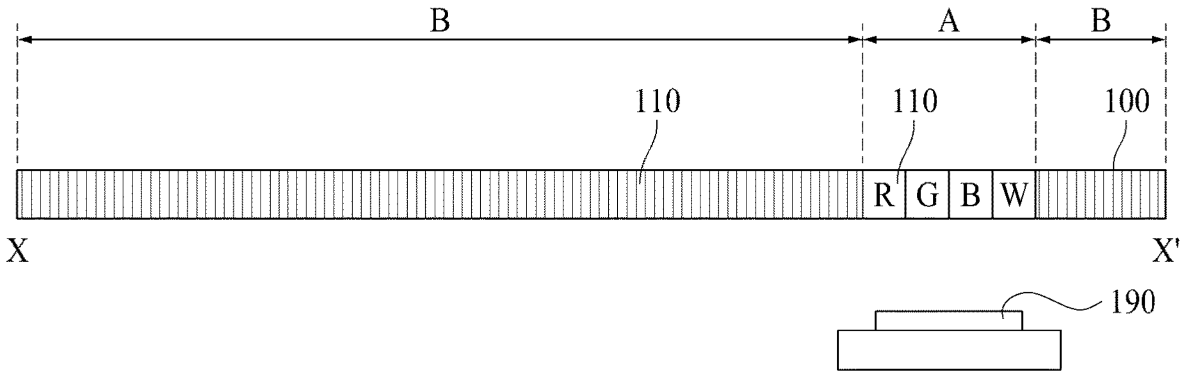
FIG. 5 is a cross-sectional view illustrating a camera and a light-emitting display panel applied to a light-emitting display apparatus according to an embodiment of the present disclosure.

FIG. 4 is a perspective view illustrating an external appearance of a light-emitting display apparatus according to an embodiment of the present disclosure. In FIG. 4, a smartphone is illustrated as an example of a light-emitting display apparatus according to the present disclosure, but is not limited thereto. FIG. 5 is a cross-sectional view illustrating a camera 190 and a light-emitting display panel 100 applied to a light-emitting display apparatus according to an embodiment of the present disclosure, and particularly, FIG. 5 illustrates a cross-sectional surface taken along line X-X' illustrated in FIG. 4.

As described above, the light-emitting display apparatus according to the present disclosure can include a light-emitting display panel 100 including the gate lines GL1 to GLg and the data lines DL1 to DLd, the controller 400, the gate driver 200, the data driver 300, and the power supply 500.

The camera 190, as illustrated in FIG. 5, can be provided under the light-emitting display panel 100. For example, the camera 190 can capture an image by receiving light that passes through a pixel region (e.g., camera region A) that has a lower pixel density where pixels are spaced further apart from each other than a normal region B where pixels are packed more closely together.

The light-emitting display panel 100, as illustrated in FIG. 5, can include a camera region A corresponding to the camera 190 and a normal region B where the camera 190 is not provided.

In this situation, when the camera 190 is provided under the light-emitting display panel 100, the image quality of the camera 190 can be degraded by interference from various wiring lines (e.g., the gate lines GL1 to GLg and the data lines DL1 to DLd) included in the light-emitting display panel 100. Further, a transmittance of the camera region A is typically high so that light passes through the light-emitting display panel 100 and is transmitted to the camera 190.

Therefore, as illustrated in FIG. 5, in the light-emitting display panel 100, a density of pixels 110 in the camera region A (e.g., the portion of the display panel that overlaps with camera 190) can be less than a density of pixels 110 of the normal region B including no camera. For example, the pixels located in camera region A can be spaced further apart from each other than the pixels located in the normal region B, in order to allow for light to pass through to camera 190 for taking pictures.

For example, a transmittance of the camera region A is typically set to be high so that light is transmitted from the outside of the light-emitting display panel 100 to the camera 190, and elements for blocking light can be reduced or minimized. For example, the elements can include an optical film and a line for transferring a signal. To this end, a density of pixels 110 in the camera region A can be set to be lower than a density of pixels 110 in the normal region B, and each of the pixels 110 can include a region which is higher in transmittance than a portion displaying an image and a portion which does not display an image.

In this situation, because a density of pixels 110 of the camera region A differs from a density of pixels 110 of the normal region B and a transmittance of the camera region A is higher than that of the normal region B, even when data voltages corresponding to the same or substantially same luminance are supplied to pixels included in the camera region A and pixels included in the normal region B, luminance of the camera region A can differ from that of the normal region B (e.g., the luminance of the camera region A may appear dimmer or less bright to a viewer, even though they should be displaying the same image or same color as other portions in the normal region B).

In order to solve such a limitation, the controller 400 applied to the present disclosure can correct or compensate input images Ri, Gi, and Bi by using a white correction value and a monochromatic correction value to generate image data Data (e.g., image data values sent to the pixels in the camera region A can be adjusted brighter, in order to compensate for their sparsity). The white correction value and the monochromatic correction value can be stored in the storage unit 450.

The data driver 300 can convert the image data Data, received from the controller 400, into data voltages Vdata and can supply the data voltages Vdata to the data lines DL1 to DLd, but embodiments of the present disclosure are not limited thereto.

Here, the white correction value can include information associated with a luminance difference when each of the camera region A and the normal region B displays a white image, and the monochromatic correction value can include information associated with a luminance difference when each of the camera region A and the normal region B displays a monochromatic image.

In this situation, a monochromatic correction value can be generated for each of a red image, a green image, and a blue image displayed by the light-emitting display panel 100.

Hereinafter, a method of generating image data by using a light-emitting display apparatus according to an embodiment of the present disclosure will be described with reference to FIGS. 1 to 7.

Figure 6:
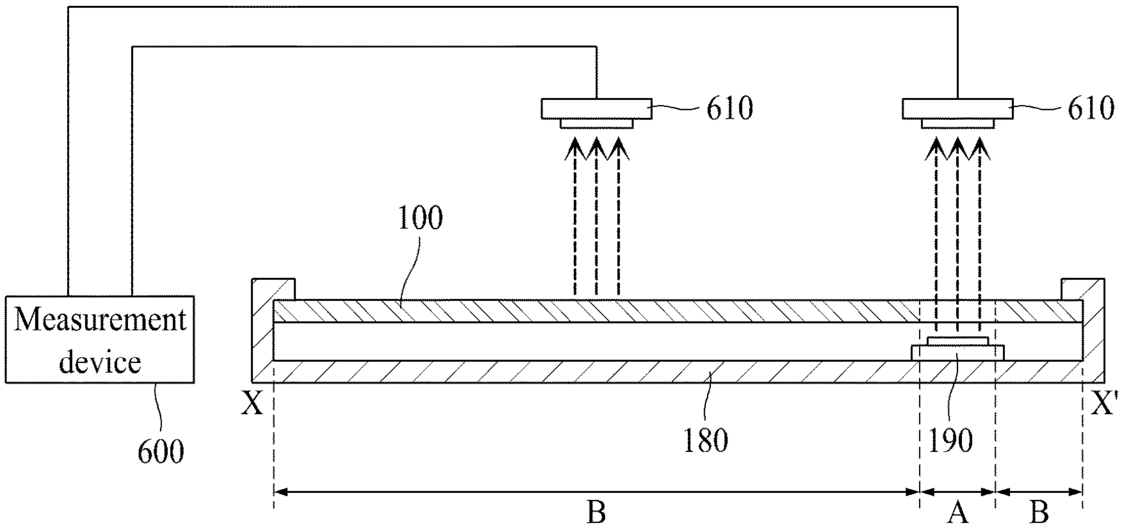
FIG. 6 is an example diagram for describing a method of generating a white correction value and a monochromatic correction value in a light-emitting display apparatus according to an embodiment of the present disclosure.
Figure 7:
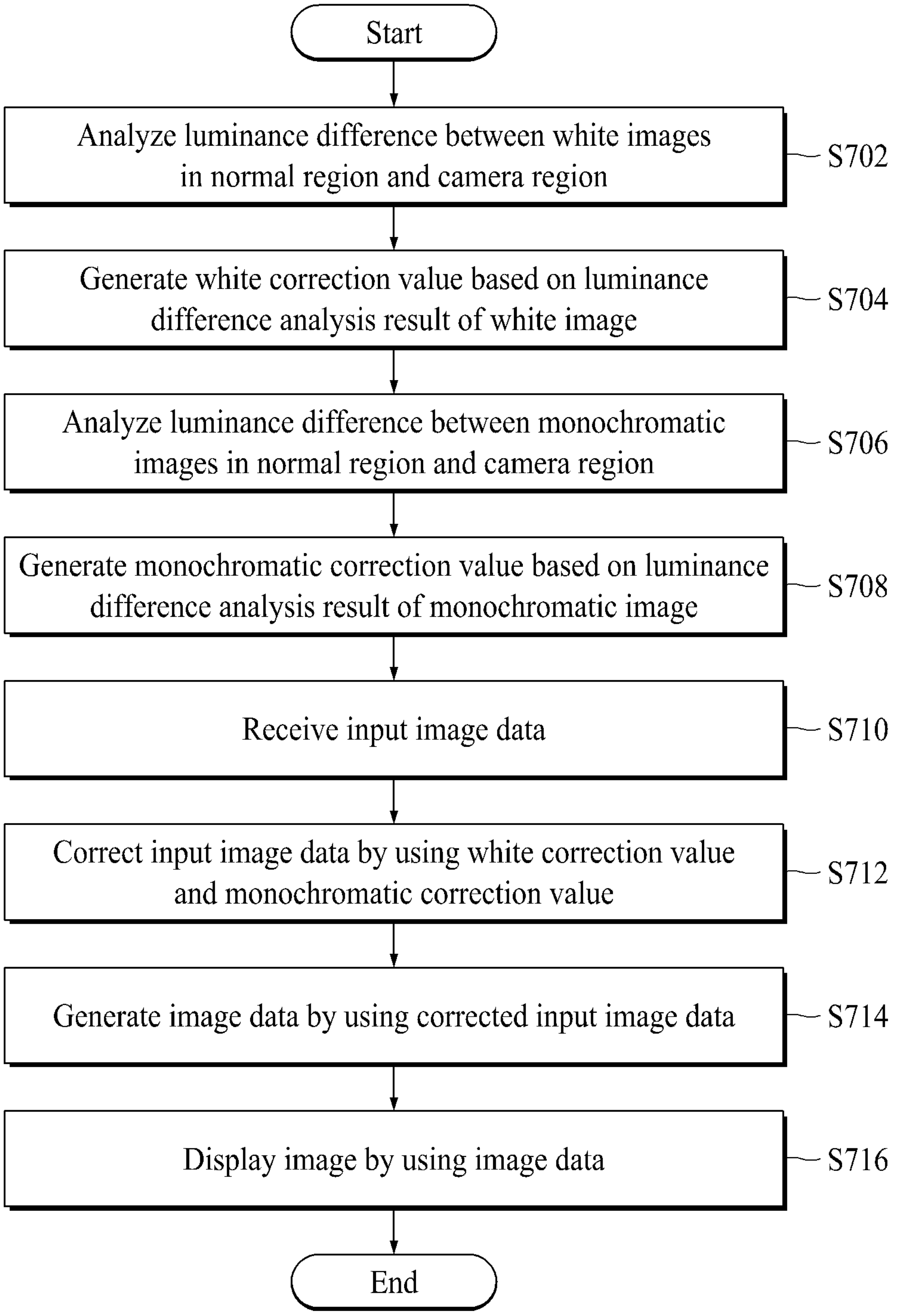
FIG. 7 is a flowchart illustrating a method of correcting input image data according to an embodiment of the present disclosure.

FIG. 6 is an example diagram for describing a method of generating a white correction value and a monochromatic correction value in a light-emitting display apparatus according to an embodiment of the present disclosure, and FIG. 7 is a flowchart illustrating a method of correcting input image data according to an embodiment of the present disclosure. In FIG. 6, a reference numeral 180 refers to a case or frame which supports the camera 190 and the light-emitting display panel 100.

For example, a method of correcting or compensating input image data according to an embodiment of the present disclosure can include a step S712 of correcting input image data to generate image data Data by using the controller 400, based on at least one of a white correction value generated through a step S704 of generating the white correction value and a monochromatic correction value generated through a step S708 of generating the monochromatic correction value, a step of generating a data voltage Vdata by using the image data Data, and a step S716 of outputting the data voltage Vdata to the data line DL by using the data driver 300.

A method of correcting input image data according to an embodiment of the present disclosure will be described below in detail.

First, in a process of manufacturing a light-emitting display apparatus, the white correction value can be generated through a step S702 of analyzing a luminance difference of a white image (S704).

To this end, as illustrated in FIG. 6, a measurement camera 610 can be provided in the camera region A and the normal region B of the light-emitting display apparatus, and then, the light-emitting display apparatus can display a white image.

The white image can be captured by the measurement camera 610 as the measurement camera 610 is positioned over the normal region B and as the measurement camera 610 is positioned over the camera region A, and captured information can be transferred to a measurement device 600.

The measurement camera 610, as illustrated in FIG. 6, can be individually provided in the camera region A and the normal region B (e.g., two or more different cameras can be used, or the same camera can be used by moving it over different areas of the display), but also one measurement camera 610 can simultaneously capture a white image displayed on the camera region A and a white image displayed on the normal region B (e.g., one camera can take one image of the entire display, and different areas of the captured display can be analyzed from the same image).

The measurement device 600 can analyze a luminance difference between the white images displayed on the normal region B and the camera region A of the light-emitting display panel 100.

For example, the measurement device 600 can analyze information received from the measurement camera 610 to analyze the luminance difference between the white images displayed on the normal region B and the camera region A.

For example, image data Data which enable a white image having the same or substantially same luminance to be displayed across the entire screen can be supplied to pixels 110 provided in the normal region B and pixels 110 provided in the camera region A. Accordingly, luminance of the camera region A can be the same as that of the normal region B.

However, as described above, a density of pixels 110 of the camera region A can differ from a density of pixels 110 of the normal region B, and a transmittance of the camera region A can be higher than that of the normal region B. To this end, the pixels of the camera region A can be transparent. Accordingly, even when the camera region A and the normal region B display the same white images based on the same or substantially same image data, luminance sensed through the measurement camera 610 can differ for the two different areas.

Therefore, the measurement device 600 can analyze information received from the measurement camera 610 to analyze a luminance difference between the white images displayed on the normal region B and the camera region A (S702), and thus, can generate the white correction value (S704).

For example, in a situation where the camera region A and the normal region B both display white images based on the same or substantially same image data, when luminance of the camera region A is 10% less than the luminance of the normal region B, the measurement device 600 can generate the white correction value which enables correction of luminance which is about less than 10%. For example, the white correction value can be set to that luminance of data sent to pixels in the normal region B can be decreased by about 10%, or the white correction value can be set to that luminance of data sent to pixels in the camera region A can be increased by about 10%. But the embodiments are not limited thereto.

The generated white correction value can be stored in the storage unit 450 of the controller 400.

In this situation, in a step S702 of analyzing a luminance difference between white images, when the camera region A and the normal region B display white images corresponding to at least three different luminance levels, a luminance difference between the camera region A and the normal region B can be analyzed.

For example, when a brightest white image (e.g., a white image corresponding to a gray level of 255) is displayed, a luminance difference between the camera region A and the normal region B can be analyzed, and when a middle-brightness white image (e.g., a white image corresponding to a gray level of 127) is displayed, a luminance difference between the camera region A and the normal region B can be analyzed. Further, when a low-brightness white image (e.g., a white image corresponding to a gray level of 31) is displayed, a luminance difference between the camera region A and the normal region B can be analyzed. But the embodiments are not limited thereto.

In this situation, a white correction value can be generated by using at least three luminance difference values generated based on luminance differences corresponding to three gray levels and at least one interpolation difference values generated based on the at least three luminance difference values.

To provide an additional description, in a state where a white image corresponding to all luminance levels (e.g., gray levels of 0 to 255) is displayed, when a luminance difference between the camera region A and the normal region B is analyzed, a complete white correction value can be generated.

To this end, however, a sufficiently long analysis period may be needed.

Therefore, in the present disclosure, in a state where white images corresponding to at least three different luminance levels are displayed, a luminance difference between the camera region A and the normal region B can be analyzed, and luminance differences corresponding to the other gray levels can be generated based on at least three different luminance difference values by using an interpolation scheme. A plurality of white correction values can be generated from the luminance difference values.

Subsequently, a monochromatic correction value can be generated through a step S706 of analyzing a luminance difference of a monochromatic image (S708).

To this end, as illustrated in FIG. 6, the measurement camera 610 can be provided in the camera region A and the normal region B of the light-emitting display apparatus, and then, the light-emitting display apparatus can display a monochromatic image.

A monochromatic image can be captured by the measurement camera 610, and captured information can be transferred to the measurement device 600.

The measurement camera 610, as illustrated in FIG. 6, can be individually provided in the camera region A and the normal region B, but alternatively, one measurement camera 610 can be used to simultaneously capture a monochromatic image displayed across the entire screen including the camera region A and the normal region B.

The measurement device 600 can analyze a luminance difference between monochromatic images displayed on the normal region B and the camera region A of the light-emitting display panel 100 (S706).

For example, the measurement device 600 can analyze information received from the measurement camera 610 to analyze the luminance difference between the monochromatic images displayed on the normal region B and the camera region A.

For example, image data Data which enable a monochromatic image having the same or substantially same luminance to be displayed can be supplied to the pixels 110 provided in the normal region B and the pixels 110 provided in the camera region A. Accordingly, luminance of the camera region A should be the same as the luminance of the normal region B since both regions are receiving the same monochromatic image data.

However, as described above, a density of pixels 110 of the camera region A can differ from a density of pixels 110 of the normal region B, and a transmittance of the camera region A can be higher than that of the normal region B. Accordingly, even when the camera region A and the normal region B display monochromatic images based on the same or substantially same monochromatic image data, luminance substantially sensed through the measurement camera 610 can differ for the two regions. For example, the camera region A may appear dimmer or less bright than the normal region B even though both regions are supposed to be displaying the same monochromatic (e.g., a green full screen image, a blue full screen image, or a red full screen image).

Therefore, the measurement device 600 can analyze information received from the measurement camera 610 to analyze a luminance difference between the monochromatic images displayed on the normal region B and the camera region A (S706), and thus, can generate the monochromatic correction value (S708).

For example, in a situation where the camera region A and the normal region B display monochromatic images based on the same or substantially same image data, when luminance of the camera region A is about 8% less than that of the normal region B, the measurement device 600 can generate the monochromatic correction value which enables correction of luminance which is about less than 8%. For example, the monochromatic correction value can be set to that luminance of data sent to pixels in the normal region B can be decreased by about 8%, or the monochromatic correction value can be set to that luminance of data sent to pixels in the camera region A can be increased by about 8%. But the embodiments are not limited thereto.

The generated monochromatic correction value can be stored in the storage unit 450 of the controller 400.

In this situation, in a step S706 of analyzing a luminance difference between monochromatic images, when the camera region A and the normal region B display monochromatic images corresponding to at least three different luminance levels, a luminance difference between the camera region A and the normal region B can be analyzed.

For example, when a brightest monochromatic image (e.g., a monochromatic image corresponding to a gray level of 255) is displayed, a luminance difference between the camera region A and the normal region B can be analyzed, and when a middle-brightness monochromatic image (e.g., a monochromatic image corresponding to a gray level of 127) is displayed, a luminance difference between the camera region A and the normal region B can be analyzed. Further, when a low-brightness monochromatic image (e.g., a monochromatic image corresponding to a gray level of 31) is displayed, a luminance difference between the camera region A and the normal region B can be analyzed. But the embodiments are not limited thereto.

In this situation, a monochromatic correction value can be generated by using at least three luminance difference values generated based on luminance differences corresponding to three different gray levels and at least one interpolation difference value can be generated based on the at least three luminance difference values.

To provide an additional description, in a state where a monochromatic image corresponding to all luminance levels (for example, gray levels of 0 to 255) is displayed, when a luminance difference between the camera region A and the normal region B is analyzed, a complete monochromatic correction value can be generated.

To this end, however, a sufficiently long analysis period can be needed.

Therefore, in the present disclosure, in a state where a same monochromatic image corresponding to at least three different luminance levels is displayed, a luminance difference between the camera region A and the normal region B can be analyzed, and luminance differences corresponding to the other gray levels for the same monochromatic image can be generated from at least three luminance difference values by using an interpolation scheme. A monochromatic correction value can be generated from the luminance difference values.

A step S706 of analyzing a luminance difference of a monochromatic image and a step S708 of generating a monochromatic correction value can be performed on each of a red image, a green image, and a blue image.

For example, when unit pixels included in a light display emitting display panel include a red pixel R, a green pixel G, a blue pixel B, and a white pixel W, the monochromatic image described above can be a red image, a green image, or a blue image.

To provide an additional description, a luminance difference between the camera region A and the normal region B when a white image is displayed can differ from a luminance difference between the camera region A and the normal region B when a monochromatic image is displayed, and moreover, a luminance difference between single colors can differ.

For example, a luminance difference between the camera region A and the normal region B when a red image is displayed, a luminance difference between the camera region A and the normal region B when a green image is displayed, and a luminance difference between the camera region A and the normal region B when a blue image is displayed can differ.

Accordingly, in monochromatic images as well as with a white image, the present disclosure can analyze a luminance difference between the camera region A and the normal region B to generate the white correction value and the monochromatic correction value.

For example, the monochromatic correction value can include correction values respectively corresponding to a red image, a green image, and a blue image.

The white correction value generated through the processes described above can be used to correct pixels 110 included in the camera region A, used to correct pixels 110 included in the normal region B, and used to correct pixels 110 included in both of the camera region A and the normal region B also. For example, pixels 110 included in the camera region A can be adjusted brighter or pixels 110 included in the normal region B can be adjusted dimmer, or a combination of adjusting brightness levels of pixels in both the camera region A and the normal region B can be implemented.

Moreover, the monochromatic correction value generated through the processes described above can be used to correct pixels 110 included in the camera region A, used to correct pixels 110 included in the normal region B, and used to correct pixels 110 included in the camera region A and the normal region B also.

Hereinafter, for convenience of description, a light-emitting display apparatus where the white correction value and the monochromatic correction value are used to correct the pixels 110 included in the camera region A will be described as an example of the present disclosure.

Subsequently, the white correction value and the monochromatic correction value generated through the processed described above can be stored in the storage unit 450.

Subsequently, when a light-emitting display apparatus where the white correction value and the monochromatic correction value are stored in the storage unit 450 have been manufactured, the light-emitting display apparatus can be used by a user.

Subsequently, when the light-emitting display apparatus is used by the user, input image data Ri, Gi, and Bi can be received from the external system (S710).

Subsequently, the controller 400 can correct the input image data Ri, Gi, and Bi by using at least one of the white correction value and the monochromatic correction value (S712).

To this end, the controller 400 can calculate a maximum value and a minimum value of the input image data Ri, Gi, and Bi respectively corresponding to a red pixel R, a green pixel G, and a blue pixel B included in a unit pixel and can determine whether a difference between the maximum value and the minimum value is greater than a reference value.

Subsequently, when the difference is less than or equal to the reference value, the controller 400 can correct the input image data by using the white correction value, and when the difference is greater than the reference value, the controller 400 can correct the input image data by using both the white correction value and the monochromatic correction value.

For example, the reference value can be set to 127, and information thereof can be stored in the storage unit 450 in a process of manufacturing the light-emitting display apparatus.

In this situation, when grayscale values of red input image data Ri, green input image data Gi, and blue input image data Bi corresponding to a unit pixel included in the camera region A are 255, 1, and 170, the difference between the maximum value and the minimum value can be 254. But the embodiments are not limited thereto.

Therefore, 254 which is the difference between the maximum value and the minimum value can be greater than 127 which is the reference value.

The difference being greater than the reference value can denote that an image displayed on a unit pixel is a monochromatic image or at least close to being a monochromatic image.

Accordingly, in this type of situation, the controller 400 can correct input image data included in a corresponding unit pixel by using a monochromatic correction value.

For example, the controller 400 can correct the red input image data Ri by using a monochromatic correction value associated with a red image, correct the green input image data Gi by using a monochromatic correction value associated with a green image, and correct the blue input image data Bi by using a monochromatic correction value associated with a blue image.

As another example, when grayscale values of the red input image data Ri, the green input image data Gi, and the blue input image data Bi corresponding to the unit pixel included in the camera region A are 255, 150, and 170, the difference between the maximum value and the minimum value can be 105. But the embodiments are not limited thereto.

Therefore, 105 which is the difference between the maximum value and the minimum value can be less than 127 which is the reference value.

The difference being less than the reference value can denote that an image displayed on a unit pixel is close to being a white image or equal to a white image.

Accordingly, the controller 400 can correct input image data included in a corresponding unit pixel by using just the white correction value.

Subsequently, the controller 400 can generate image data Data by using the corrected input image data.

The controller 400 can transfer the generated image data Data to the data driver 300.

Finally, the data driver 300 can generate data voltages Vdata by using the image data Data, and the light-emitting display panel 100 can display an image with the image data Data (S716).

For example, when a gate pulse is supplied to the gate line GL, the data driver 300 can supply data lines DL with data voltages Vdata corresponding to the gate line GL.

Therefore, an image can be displayed on pixels connected to the gate line GL.

According to the present disclosure described above, even when the light-emitting display panel includes the camera region A with pixels that are sparsely populated, an image displayed on the camera region A can be appropriately corrected or compensated based on a white correction value and a monochromatic correction value. Accordingly, a difference between luminance of the image displayed on the camera region A and luminance of an image displayed on the normal region B may not be large.

Therefore, the camera region A may not be recognized by the eyes of a user, and thus, the quality of a light-emitting display apparatus can be enhanced. In this way, the display panel can provide improved image uniformity to a viewer.

According to the present disclosure, even when a white image is displayed or even when an image with one color of red, green, and blue is displayed, a luminance difference or a color sense difference may not occur in a camera region and a normal region, or can at least be undetectable to the naked eye.

Accordingly, the image quality of a light-emitting display apparatus can be enhanced.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the technical idea or scope of the disclosures. Thus, it is intended that the present disclosure covers the modifications and variations of this disclosure provided they come within the scope of the appended claims and their equivalents.

What is claimed is:

1. A method of correcting input image data for a display device, the method comprising:

receiving input image data by a controller in the display device, a first portion of the input image data corresponding to a first region of a display panel in the display device and a second portion of the input image data corresponding to a second region of the display panel having a pixel density different than a pixel density of the first region; and correcting, by the controller, at least some of the input image data to generate corrected image data based on at least one white correction value or at least one monochromatic correction value, wherein the at least one white correction value is generated by:

analyzing at least one white luminance difference between a first white image portion displayed on a normal region of the display panel and a second white image portion displayed on a camera region of the display panel, the normal region corresponding to the first region, and the camera region corresponding to the second region and having a lower pixel density than the normal region; and generating the at least one white correction value based on the at least one white luminance difference between the first white image portion and the second white image portion, wherein the camera region of the display panel overlaps with a camera disposed in the display device, and wherein the first white image portion and the second white image portion are portions of a same white image displayed across the display panel.

2. The method of claim 1, wherein the analyzing the at least one white luminance difference comprises analyzing at least three luminance difference values between the camera region and the normal region when white images corresponding to at least three different luminance levels are displayed on the camera region and the normal region.

3. The method of claim 2, wherein the at least one white correction value is generated based on the at least three luminance difference values and at least one interpolation difference value generated based on the at least three luminance difference values.

4. The method of claim 1, wherein the monochromatic correction value is generated by:

analyzing at least one monochromatic luminance difference between a first monochromatic image portion displayed on the normal region of the display panel and a second monochromatic image portion displayed on the camera region of the display panel; and generating the at least one monochromatic correction value based on the at least one monochromatic luminance difference between the first monochromatic image portion and the second monochromatic image portion.

5. The method of claim 4, wherein the correcting the at least some of the input image data comprises:

calculating a maximum value and a minimum value of input image data respectively corresponding to a red pixel, a green pixel, and a blue pixel included in a unit pixel in the display panel;

determining a difference between the maximum value and the minimum value;

in response to the difference between the maximum value and the minimum value being less than or equal to a reference value, correcting the at least some of the input image data based on the at least one white correction value; and in response to the difference between the maximum value and the minimum value being greater than the reference value, correcting the at least some of the input image data based on both of the at least one white correction value and the at least one monochromatic correction value.

6. A method of correcting input image data for a display device, the method comprising:

receiving input image data by a controller in the display device, a first portion of the input image data corresponding to a first region of a display panel in the display device and a second portion of the input image data corresponding to a second region of the display panel having a pixel density different than a pixel density of the first region; and correcting, by the controller, at least some of the input image data to generate corrected image data based on at least one white correction value or at least one monochromatic correction value, wherein the at least one white correction value is generated by:

analyzing at least one white luminance difference between a first white image portion displayed on a normal region of the display panel and a second white image portion displayed on a camera region of the display panel, the normal region corresponding to the first region and the camera region corresponding to the second region and having a lower pixel density than the normal region; and generating the at least one white correction value based on the at least one white luminance difference between the first white image portion and the second white image portion, wherein the monochromatic correction value is generated by:

analyzing at least one monochromatic luminance difference between a first monochromatic image portion displayed on a normal region of the display panel and a second monochromatic image portion displayed on a camera region of the display panel, the normal region corresponding to the first region and the camera region corresponding to the second region and having a lower pixel density than the normal region; and generating the at least one monochromatic correction value based on the at least one monochromatic luminance difference between the first monochromatic image portion and the second monochromatic image portion, wherein the camera region of the display panel overlaps with a camera disposed in the display device, and wherein the first monochromatic image portion and the second monochromatic image portion are portions of a same monochromatic image displayed across the display panel.

7. The method of claim 6, wherein the same monochromatic image includes at least one of a red image, a green image, and a blue image.

8. The method of claim 7, wherein the analyzing the at least one monochromatic luminance difference further comprises:

analyzing a red luminance difference between the camera region and the normal region when the red image is displayed to generate a red monochromatic correction value;

analyzing a green luminance difference between the camera region and the normal region when the green image is displayed to generate a green monochromatic correction value; and analyzing a blue luminance difference between the camera region and the normal region when the blue image is displayed to generate a blue monochromatic correction value.

9. The method of claim 8, wherein the correcting the at least some of the input image data comprises:

correcting red input image data based on the red monochromatic correction value to generate corrected red image data;

correcting green input image data based on the green monochromatic correction value to generate corrected green image data; and correcting blue input image data based on the blue monochromatic correction value to generate corrected blue image data.

10. The method of claim 6, wherein the analyzing the at least one monochromatic luminance difference comprises analyzing at least three monochromatic luminance difference values between the camera region and the normal region when monochromatic images corresponding to at least three different luminance levels are displayed on the camera region and the normal region.

11. The method of claim 10, wherein the at least one monochromatic correction value is generated based on the at least three monochromatic luminance difference values and at least one monochromatic interpolation difference value generated based on the at least three monochromatic luminance difference values.

12. A light-emitting display apparatus comprising:

a light-emitting display panel including a non-camera region and a camera region, the camera region of the light-emitting display panel having a different pixel density than the non-camera region of the light-emitting display panel;

a camera disposed under camera region of the light-emitting display panel; and a controller configured to:

receive input image data, a first portion of the input image data corresponding to the non-camera region of the light-emitting display panel and a second portion of the input image data corresponding to the camera region of the light-emitting display panel, and correct at least some of the input image data to generate corrected image data based on at least one white correction value or at least one monochromatic correction value, wherein the at least one white correction value comprises information associated with a luminance difference when a white image is displayed across the camera region and the non-camera region, and wherein the at least one monochromatic correction value comprises information associated with a monochromatic luminance difference when a monochromatic image is displayed across the camera region and the non-camera region.

13. The light-emitting display apparatus of claim 12, wherein the at least one monochromatic correction value includes a red monochromatic correction value generated for a red image, green monochromatic correction value generated for a green image, and a blue monochromatic correction value generated for a blue image.

14. The light-emitting display apparatus of claim 12, wherein the controller is further configured to:

receive a timing synchronization signal, realign the input image data to generate the corrected image data, and generate control signals based on a timing synchronization signal.

15. The light-emitting display apparatus of claim 12, wherein the controller is further configured to:

compare a reference value with a difference between a maximum value and a minimum value of the input image data, in response to the difference being less than or equal to a reference value, correct the at least some of the input image data based on the at least one white correction value, and in response to the difference being greater than the reference value, correct the at least some of the input image data based on both of the at least one white correction value and the at least one monochromatic correction value.

16. The light-emitting display apparatus of claim 12, wherein a density of pixels in the camera region of the light-emitting display panel is lower than a density of pixels in the non-camera region of the light-emitting display panel.

17. The light-emitting display apparatus of claim 12, wherein the controller is further configured to:

calculate a maximum value and a minimum value of input image data respectively corresponding to a red pixel, a green pixel, and a blue pixel included in a unit pixel, determine a difference between the maximum value and the minimum value, in response to the difference being less than or equal to a reference value, correct the at least some of the input image data based on the at least one white correction value, and in response to the difference being greater than the reference value, correct the at least some of the input image data based on both of the at least one white correction value and the at least one monochromatic correction value.

18. The light-emitting display apparatus of claim 12, wherein the at least one white correction value or the at least one monochromatic correction value includes an interpolated value generated based on two or more actual luminance differences measured for the non-camera region and the camera region.

* * * * *